(12) United States Patent
Choi et al.

(10) Patent No.: US 11,954,833 B2
(45) Date of Patent: Apr. 9, 2024

(54) ELECTRONIC DEVICE FOR SUPPORTING MACHINE LEARNING-BASED IMAGE PROCESSING

(71) Applicant: Samsung Electronics Co., Ltd., Gyeonggi-do (KR)

(72) Inventors: Woojhon Choi, Gyeonggi-do (KR); Wonjoon Do, Gyeonggi-do (KR); Jaesung Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 184 days.

(21) Appl. No.: 17/678,557

(22) Filed: Feb. 23, 2022

(65) Prior Publication Data

US 2022/0318971 A1 Oct. 6, 2022

Related U.S. Application Data

(63) Continuation of application No. PCT/KR2022/001732, filed on Feb. 4, 2022.

(30) Foreign Application Priority Data

Apr. 2, 2021 (KR) .................. 10-2021-0043585

(51) Int. Cl.
*G06T 5/50* (2006.01)
*H04N 23/80* (2023.01)

(52) U.S. Cl.
CPC ............. *G06T 5/50* (2013.01); *H04N 23/815* (2023.01); *G06T 2207/10024* (2013.01); *G06T 2207/20081* (2013.01); *G06T 2207/20224* (2013.01)

(58) Field of Classification Search
CPC ............. G06T 5/50; G06T 2207/10024; G06T 2207/20081; G06T 2207/20224; H04N 23/815; H04N 23/617

(Continued)

(56) References Cited

U.S. PATENT DOCUMENTS 10,860,919 B2  12/2020  Kanazawa et al.
11,442,266 B1 *  9/2022  Kermani ................. G06T 5/006

(Continued)

FOREIGN PATENT DOCUMENTS

CN  109979382  7/2019
CN  110460825  11/2019

(Continued)

OTHER PUBLICATIONS

Yuqian Zhou et al., "UDC 2020 Challenge on Image Restoration of Under-Display Camera: Methods and Results", Aug. 2020, 15 pages.

(Continued)

*Primary Examiner* — Lin Ye
*Assistant Examiner* — Chan T Nguyen
(74) *Attorney, Agent, or Firm* — The Farrell Law Firm, P.C.

(57) ABSTRACT

An electronic device is provided, which includes a display; an under display camera (UDC); a processor; and a memory that stores instructions, which when executed, causes the processor to receive a first image from the UDC, generate a second image by lowering a resolution of the first image, obtain a third image representing a difference between the second image and an image corresponding to the second image in which artifacts are not present, generate a fourth image by increasing the resolution of the third image, and generate a fifth image by subtracting the fourth image from the first image.

15 Claims, 11 Drawing Sheets

(58) Field of Classification Search
USPC .......................................................... 348/242
See application file for complete search history.

(56) References Cited

U.S. PATENT DOCUMENTS

| | | | |
|---|---|---|---|
| 2019/0385288 A1* | 12/2019 | Stewart | ................... G06T 5/002 |
| 2020/0218961 A1* | 7/2020 | Kanazawa | .............. H04L 12/40 |
| 2020/0389575 A1 | 12/2020 | Gove | |
| 2021/0104021 A1 | 4/2021 | Sohn et al. | |
| 2021/0358092 A1* | 11/2021 | Mironica | ................ G06T 5/005 |
| 2022/0159162 A1* | 5/2022 | Sun | ......................... G06T 5/003 |
| 2023/0079285 A1* | 3/2023 | Umeda | ................. H04N 25/50 |
| | | | 348/207.99 |

FOREIGN PATENT DOCUMENTS

| | | |
|---|---|---|
| KR | 1020180108288 | 10/2018 |
| KR | 10-1990092 | 6/2019 |
| KR | 10-1996730 | 7/2019 |
| KR | 1020190119548 | 10/2019 |
| KR | 1020200129168 | 11/2020 |
| KR | 1020210018668 | 2/2021 |
| KR | 1020220014764 | 2/2022 |
| WO | WO 2022/025413 | 2/2022 |

OTHER PUBLICATIONS

International Search Report dated May 4, 2022 issued in counterpart application No. PCT/KR2022/001732, 14 pages.

* cited by examiner

ELECTRONIC DEVICE FOR SUPPORTING MACHINE LEARNING-BASED IMAGE PROCESSING

CROSS-REFERENCE TO RELATED APPLICATION(S)

This application is a bypass continuation application of International Application No. PCT/KR2022/001732, which was filed on Feb. 4, 2022, and is based on and claims priority under 35 U.S.C. § 119 to Korean Patent Application No. 10-2021-0043585, which was filed in the Korean Intellectual Property Office on Apr. 2, 2021, the entire disclosure of each of which is incorporated herein by reference.

BACKGROUND

1. Field

The disclosure relates generally to an image processing technology using an artificial intelligence (AI) model based on machine learning in order to improve image quality.

2. Description of Related Art

An under display camera (UDC) is disposed under a display, and receives light through the display. Because the display is between the UDC and a subject being photographed, the subject may be distorted in an image taken by the UDC (hereinafter, "a UDC image"). For example, due to a microstructure of the display, in which pixels and wirings are repeated, light may be diffracted. Due to such a diffraction phenomenon, artifacts (e.g., a light leak pattern), which are not actually present on the subject, may be included in the UDC image.

To improve image quality, a UDC image may be post-processed using an AI model based on machine learning (e.g., deep learning constructed by an artificial neural network). However, because current machine learning-based AI models require a large amount of computation for image quality improvement, the processing may take a relatively long time, and thus the image quality improvement effect may be rather reduced.

Accordingly, a need exists for an electronic device that can quickly improve quality of a UDC image.

SUMMARY

The disclosure addresses at least the problems and/or disadvantages described above and provides at least the advantages described below.

An aspect of the disclosure is to provide an electronic device and method thereof, which can effectively and quickly improve quality of UDC images using a machine learning-based AI model.

In accordance with an aspect of the disclosure, an electronic device is provided, which includes a camera; a display located between a subject to be photographed by the camera and the camera; a processor connected to the camera and the display; and a memory operatively connected to the processor, wherein the memory, when executed, stores instructions causing the processor to: receive a first image from the camera, generate a second image by lowering a resolution of the first image, obtain a third image representing a difference between the second image and an image corresponding to the second image in which artifacts are not present, generate a fourth image by increasing the resolution of the third image, and generate a fifth image by subtracting the fourth image from the first image.

In accordance with another aspect of the disclosure, a method is provided for an electronic device. The method includes receiving a first image from a camera of the electronic device; generating a second image by lowering a resolution of the first image; obtaining a third image representing a difference between the second image and an image corresponding to the second image in which artifacts are not present; generating a fourth image by increasing the resolution of the third image; and generating a fifth image by subtracting the fourth image from the first image.

In accordance with another aspect of the disclosure, a non-transitory recording medium is provided, which stores instructions that are readable by a processor of an electronic device. The instructions, when executed by the processor, cause the processor to receive a first image from the camera of the electronic device, generate a second image by lowering a resolution of the first image, obtain a third image representing a difference between the second image and an image corresponding to the second image in which artifacts are not present, generate a fourth image by increasing the resolution of the third image, and generating a fifth image by subtracting the fourth image from the first image.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Various embodiments of the disclosure will now be described in detail with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
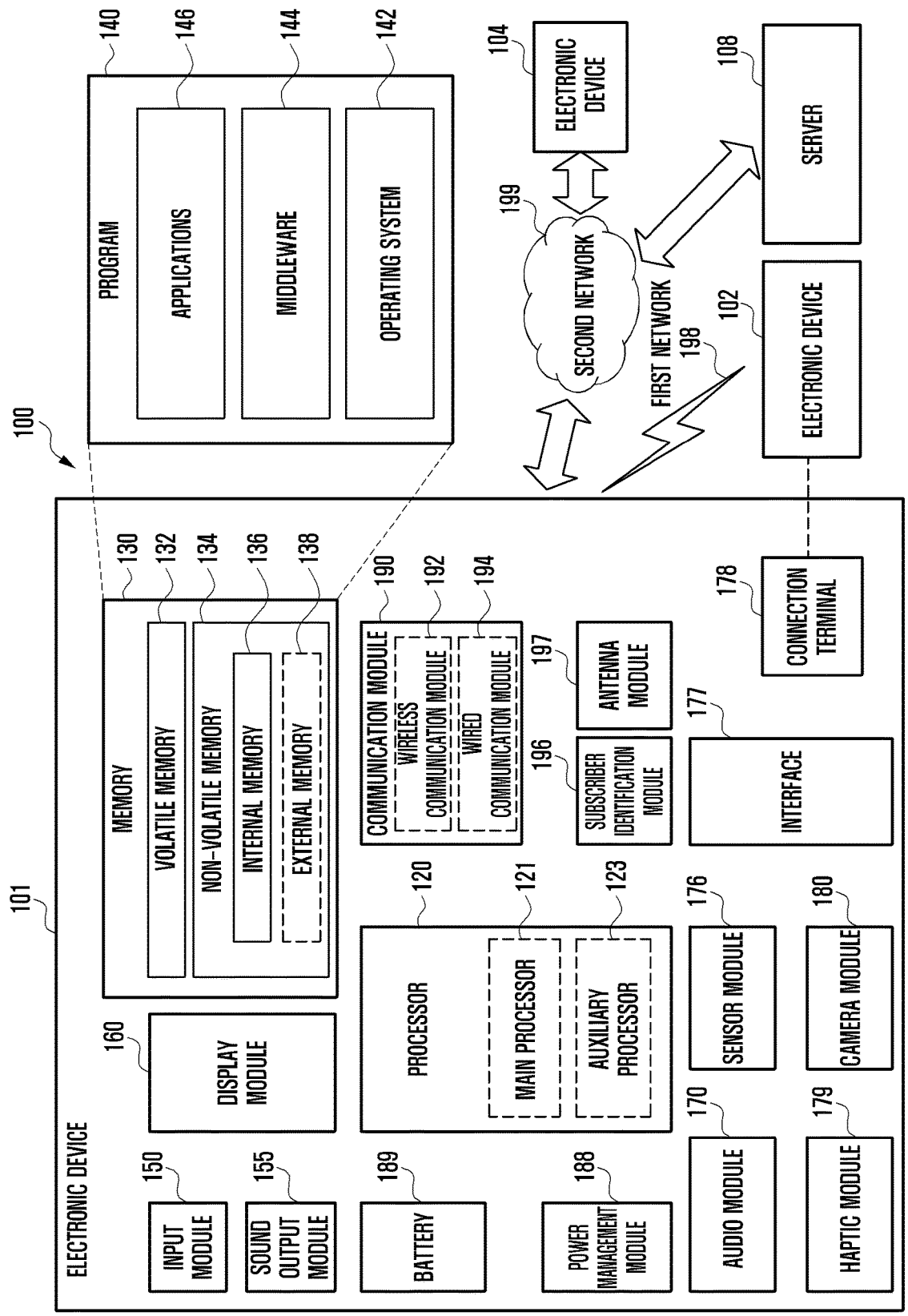
FIG. 1 is a block diagram of an electronic device in a network environment according to an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for AI model processing. An AI model may be generated by machine learning. Such learning may be performed, e.g., by the electronic device 101 where the AI is performed or via a separate server (e.g., the server 108). Learning algorithms may include, but are not limited to, e.g., supervised learning, unsupervised learning, semi-supervised learning, or reinforcement learning. The AI model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network, or a combination of two or more thereof but is not limited thereto. The AI model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
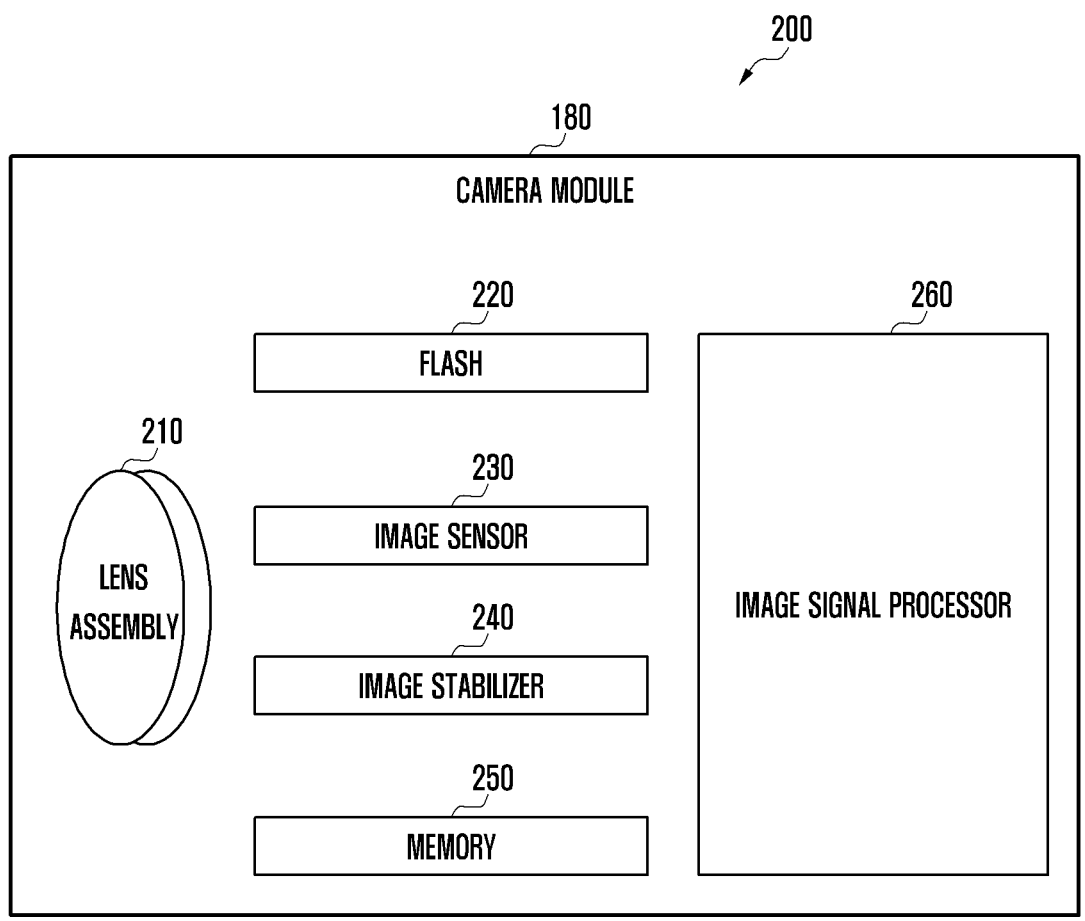
FIG. 2 is a block diagram exemplifying a camera module according to an embodiment.

FIG. 2 is a block diagram 200 illustrating the camera module 180 according to an embodiment.

Referring to FIG. 2, the camera module 180 may include a lens assembly 210, a flash 220, an image sensor 230, an image stabilizer 240, memory 250 (e.g., buffer memory), or an ISP 260.

The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an IR LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the ISP 260. According to an embodiment, the memory 250 may be configured as at least part of the memory 130 or as a separate memory that is operated independently from the memory 130.

The ISP 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the ISP 260 may perform control (e.g., exposure time control or read-out timing control) with respect to at least one (e.g., the image sensor 230) of the components included in the camera module 180. An image processed by the ISP 260 may be stored back in the memory 250 for further processing, or may be provided to an external component (e.g., the memory 130, the display module 160, the electronic device 102, the electronic device 104, or the server 108) outside the camera module 180. According to an embodiment, the ISP 260 may be configured as at least part of the processor 120, or as a separate processor that is operated independently from the processor 120. If the ISP 260 is configured as a separate processor from the processor 120, at least one image processed by the ISP 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3A:
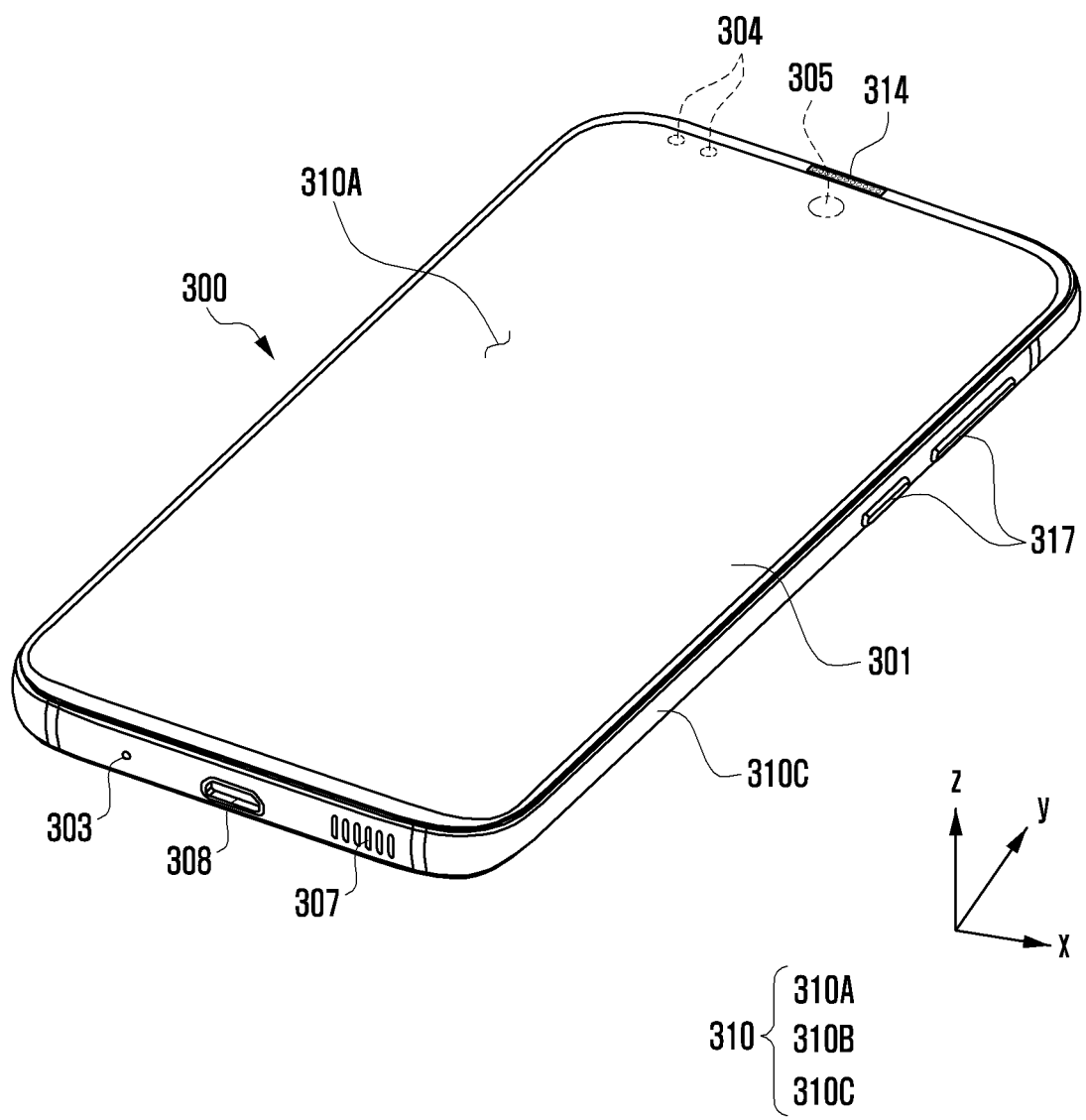
FIG. 3A is a perspective view of a front surface of an electronic device having a bar type housing structure according to an embodiment.
Figure 3B:
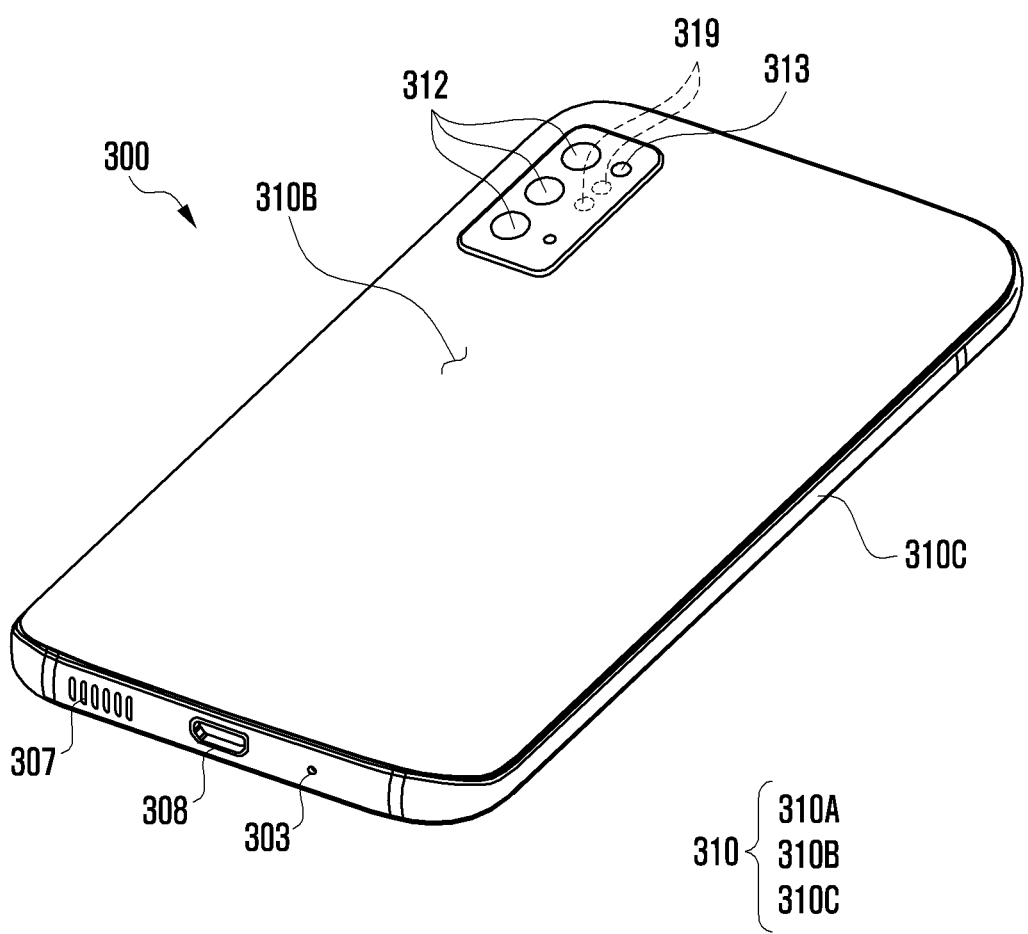
FIG. 3B is a perspective view of a rear surface of the electronic device of FIG. 3A, according to an embodiment.

FIG. 3A is a perspective view of a front surface of an electronic device 300 having a bar type housing structure according to an embodiment. FIG. 3B is a perspective view of a rear surface of the electronic device 300 of FIG. 3A, according to an embodiment.

Referring to FIGS. 3A and 3B, a housing 310 of an electronic device 300 (e.g., electronic device 101 of FIG. 1) according to an embodiment may include a first surface (or front surface) 310A, a second surface (or rear surface) 310B, and a side surface 310C surrounding a space between the first surface 310A and the second surface 310B. According to an embodiment, the first surface 310A may include a front plate (e.g., a glass plate or a polymer plate including various coating layers) of which at least a part is substantially transparent. The second surface 310B may include a rear plate that is substantially opaque. The side surface 310C may be combined with the front plate and the rear plate and may be composed of a side bezel structure (or side member) including metal and/or polymer.

According to an embodiment, the electronic device 300 may include at least one of a display 301, a micro hole 303, speaker holes 307 and 314, sensor modules 304 and 319, camera modules 305, 312, and 313, a key input device 317, and a connector 308. In a certain embodiment, the electronic device 300 may omit at least one (e.g., key input device 317) of constituent elements, or may additionally include other constituent elements.

The display 301 (e.g., display module 160 of FIG. 1) may be exposed through the first surface 310A. The display 301 may be combined with or may be adjacently disposed with a touch sensing circuit, a pressure sensor capable of measuring intensity (pressure) of a touch, and/or a digitizer detecting a magnetic field type stylus pen.

Hereinafter, a surface on which the display 301 (e.g., a main display) is disposed will be referred to as a front surface 310A of the electronic device 300, and a surface opposite to the front surface 310A will be referred to as a rear surface 310B of the electronic device 300. A separate display (e.g., auxiliary display) may be disposed on the rear surface 310B. Accordingly, the display 301 disposed on the front surface 310A may be referred to as a front display, and the display disposed on the rear surface 310B may be referred to as a rear display.

Alternatively, the electronic device 300 may have a foldable housing structure rather than the illustrated bar-type housing structure. The foldable housing structure may be divided into two housings around a folding axis. A first part of the front display (e.g., flexible display) may be disposed on the front surface of the first housing, and a second part of the display may be disposed on the front surface of the second housing. The foldable housing structure may be implemented in an in-folding method in which the first part and the second part of the front display face each other in case that the electronic device is in a folded state. Further, the foldable housing structure may be implemented in an out-folding method in which the first part and the second part of the front display are directed opposite to each other in case that the electronic device is in the folded state. A second display may be disposed on the rear surface of the first housing and/or the rear surface of the second housing. As another example, the electronic device may have a slidable housing structure rather than the illustrated bar type housing structure. For example, the electronic device may include a housing, a slider part, a roller enabling a part of the slider part to be drawn into the housing or to be drawn out of the housing, and a flexible display (e.g., front display).

The sensor modules 304 and 319 (e.g., sensor module 176 of FIG. 1) may generate electrical signals or data in response to an inner operation state of the electronic device 300 or an external environmental state. In an embodiment, the sensor modules 304 and 319 may include a first sensor module 304 (e.g., proximity sensor and/or fingerprint sensor) disposed on the first surface 310A, and/or a second sensor module 319 (e.g., a heart rate monitor (HRM) sensor) disposed on the second surface 310B. In case that the display 301 is seen above the first surface 310A, the first sensor module 304 may be disposed under the display 301.

The camera modules 305, 312, and 313 (e.g., camera module 180 of FIG. 1) may include a front camera 305 disposed on the first surface 310A, a rear camera 312 disposed on the second surface 310B, and a flash 313. The cameras 305 and 312 may include a lens assembly (including one or a plurality of lenses), an image sensor, and/or an ISP. The flash 313 may include an LED or a xenon lamp. Two or more lenses (e.g., wide angle lens, ultra-wide angle lens, or telephoto lens) and image sensors may be disposed on a surface of the electronic device 300.

In an embodiment, in case that the display 301 is seen above the first surface 310A, the front camera 305 may be disposed under the display 301, and thus may be a UDC that receives light through the display 301. Since the front camera 305 is disposed inside the electronic device 300, it becomes possible to implement even an area in which the front camera 305 is disposed as a display area. Through this, for the display area having the maximum size, the display 301 may be implemented in the form of a notch, or a display of a complete form (e.g., form in which an area on which a screen is not displayed is not present in an intermediate area of the display 301) may be implemented on one surface of the electronic device 300 without the necessity of disposing the front camera 305 in a part of the intermediate area of the display 301 so that a part of the front camera 305 is exposed.

In the display 301, a hole (e.g., punch hole) (or opening) may be formed on a region facing the front camera 305. For example, the display 301 may include several layers (e.g., polarizing film, display panel, and sub-material layer (e.g., shading layer for blocking light generated from the display panel or light incident from an outside into the display panel, heat spreading sheet, or sponge)), and in the display 301, a through-hole may be formed on the remaining layers excluding at least one layer (e.g., display panel).

As another example, a through-hole (e.g., punch hole) may be formed on all layers. At least a part of the front camera 305 (e.g., lens) may be disposed in an inner space of the hole perforated in the display 301.

Although not illustrated, a plurality of front cameras may be disposed under the display 301. The electronic device 300 may include a rear display. Accordingly, a UDC receiving light through the rear display may be additionally disposed even under the rear display.

Figure 4:
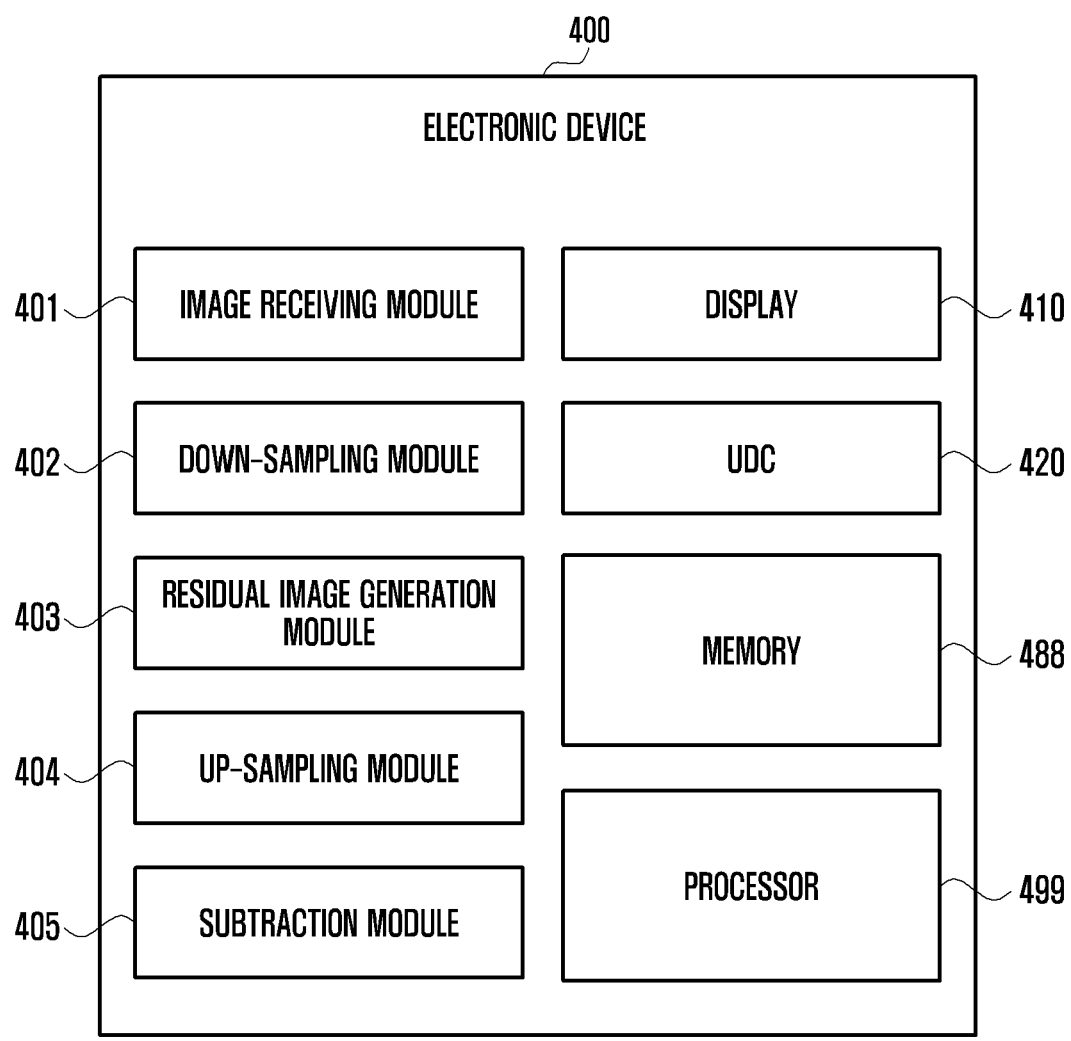
FIG. 4 is a block diagram of an electronic device configured to improve an image quality according to an embodiment.
Figure 5:
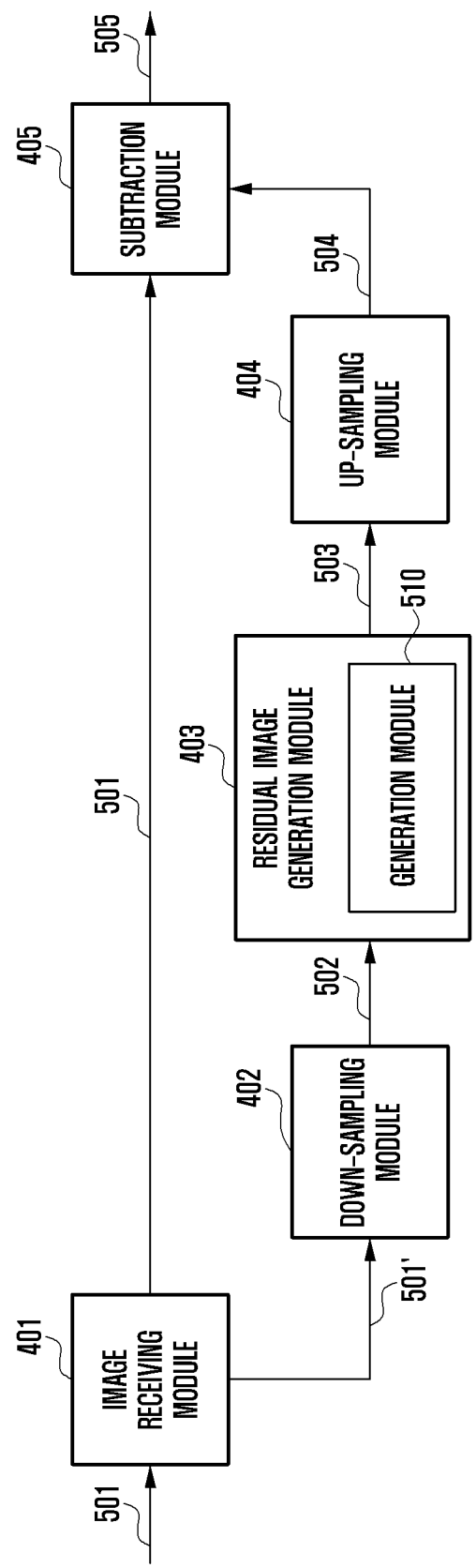
FIG. 5 is a diagram illustrating connections among modules of FIG. 4, according to an embodiment.
Figure 6:
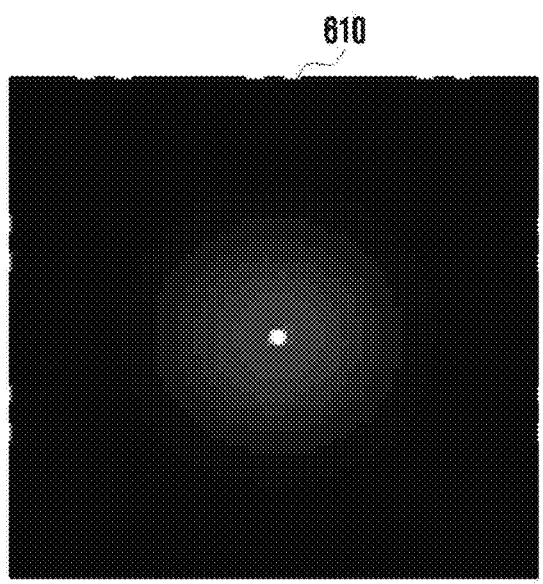
FIG. 6 illustrates a training image used to learn a generation model of FIG. 5.
Figure 6:
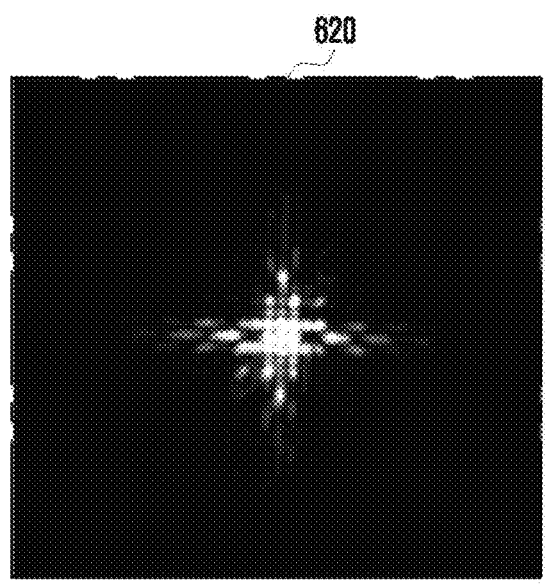
Figure 7A:
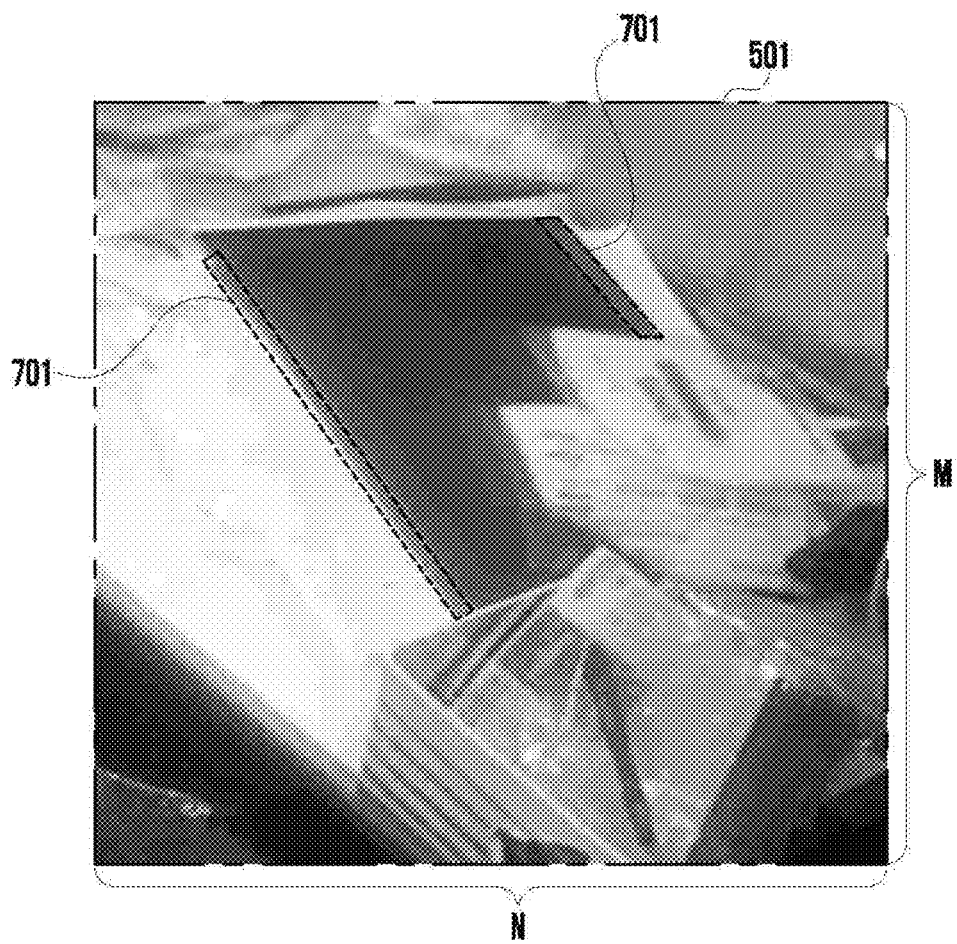
FIGS. 7A, 7B, and 7C exemplify images processed by the electronic device of FIG. 4.
Figure 7B:
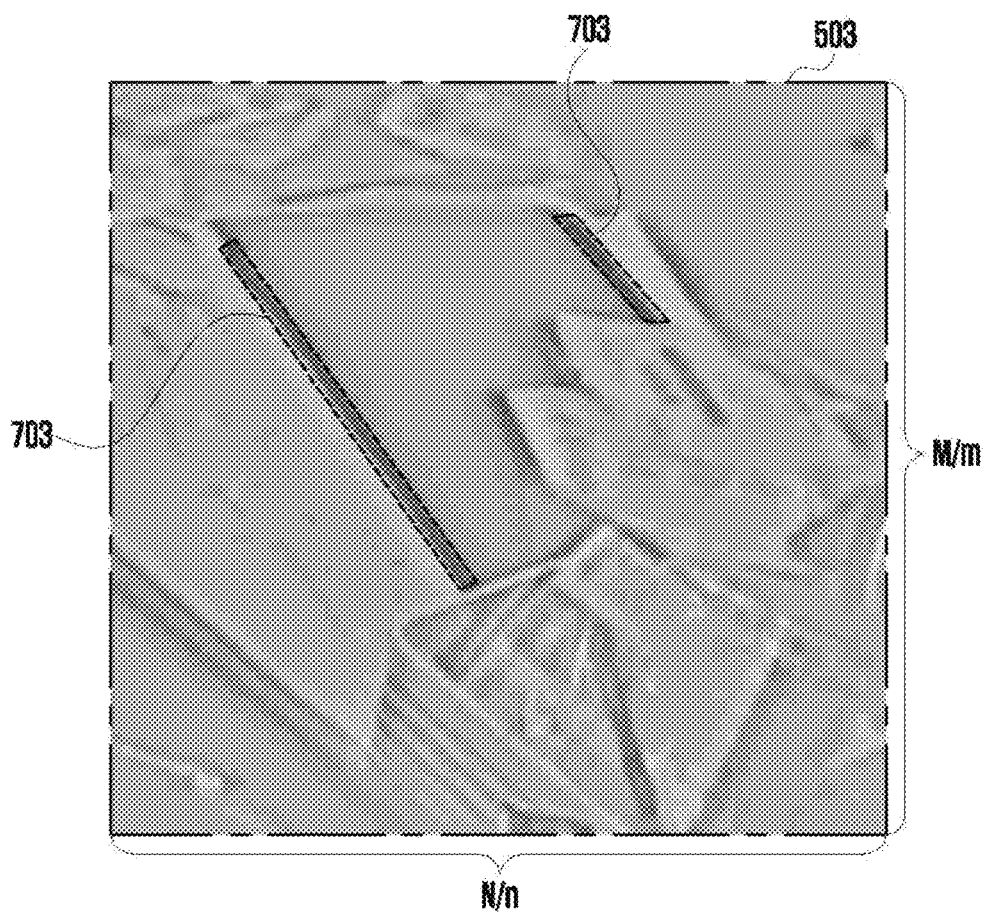
Figure 7C:
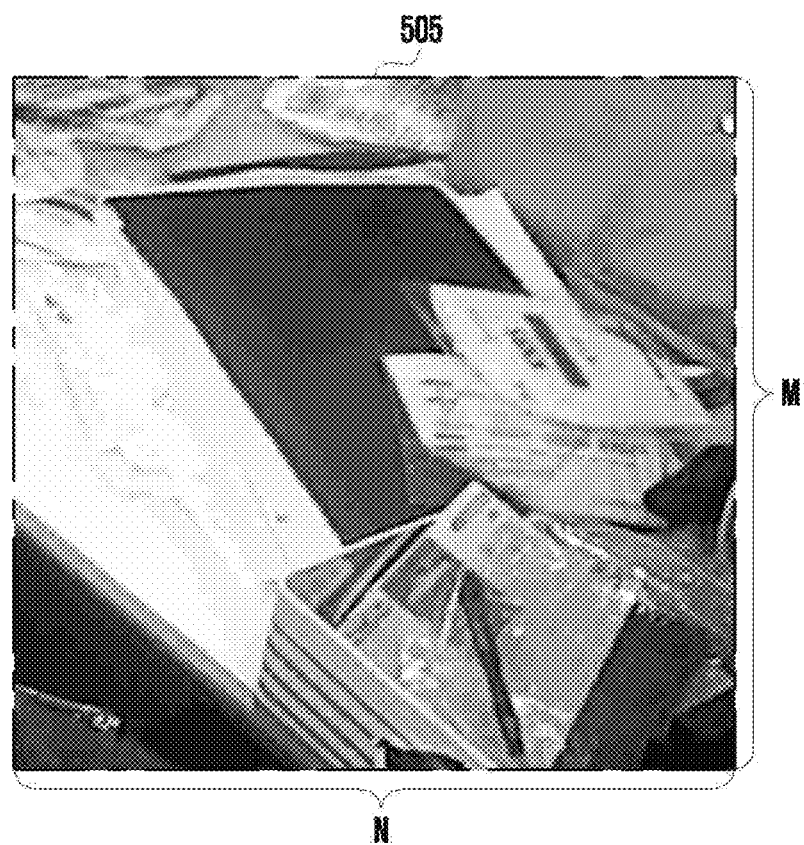

FIG. 4 is a block diagram of an electronic device 400 configured to improve an image quality according to an embodiment. FIG. 5 is a diagram illustrating connections among modules 401 to 405 of FIG. 4, according to an embodiment. FIG. 6 illustrates a training image used to learn a generation model 510 of FIG. 5. FIGS. 7A, 7B, and 7C exemplify images processed by the electronic device 400 of FIG. 4.

Referring to FIGS. 4 and 5, an electronic device 400 (e.g., electronic device 101 of FIG. 1) may include an image receiving module 401, a down-sampling module 402, a residual image generation module 403, an up-sampling module 404, a subtraction module 405, a display 410, a UDC 420, a memory 488, and a processor 499.

In case that the display 410 is seen from the front surface, the UDC 420 (e.g., front camera 305 of FIG. 3A) may be disposed under the display 410, and may generate an image (e.g., an original image) by sensing external light passing through the display 410. The display 410 displays an image using a plurality of pixels, and in accordance with the display characteristics, pixels and/or wirings may be regularly arranged therein. Due to such a regular structure, diffraction may occur on the light reaching the UDC 420 through the display 410. Due to this, at least one artifact may occur on the image generated by the UDC 420.

For example, when photographing a bright light source, such as illumination or the sun, since light blurring and/or light splitting may occur due to the strong diffraction around the light source, resolving power reduction and/or a signal to noise ratio (SNR) reduction, such as information loss or color distortion, may occur in the image generated by the UDC 420 in comparison to the image photographed by a camera module exposed to an outside, i.e., not behind a display.

When the UDC 420 generates the image by sensing the light having passed through the display 410, the pixels and/or wirings in the display 410 may degrade the light transmission, and thus, the SNR reduction may occur severely. In consideration of various artifacts that may occur in the under display camera structure, post-processing an image may be required for improving the degraded quality of the original image obtained from the UDC 420.

The above-described constituent elements of the electronic device 400 may be operatively or electrically connected to one another. The modules 401 to 405 may be operatively connected to one another as illustrated in FIG. 5, or may be program modules executed by the processor 499 (e.g., processor 120 of FIG. 1) or the image signal processor 260 of FIG. 2.

Referring to FIG. 5, the image receiving module 401 may receive the original image 501 for the image quality improvement from the UDC 420. The original image 501 (e.g., Bayer pattern data or RGB data) may be output from the image sensor 230. As another example, the original image 501 may be obtained by processing the image output from the image sensor 230 through the processor (e.g., a copy image of which the resolution has been changed). The image receiving module 401 may output the original image 501 to the subtraction module 405, and may output a copy 501' of the original image 501 to the down-sampling module 402.

For example, with reference to FIGS. 5 and 7A, the original image 501 having the resolution of N*M may be input to the image receiving module 401. In the original image 501, artifacts 701 caused by the light diffraction due to the display 410 may be present. For example, the artifacts 701 may include a portion that looks hazy around an edge between subjects.

The down-sampling module 402 may reduce the size (resolution) of the copy 501' by down-sampling (or down-scaling) the copy 501'. For example, in case that the resolution of the copy 501' is N (the number of horizontal pixels)*M (the number of vertical pixels), the down-sampling module 402 may reduce the size to (N/n)*(M/m). Although not restricted, N may be an integer multiple of n. Also, M may be an integer multiple of m. The down-sampling module 402 may output a down-sampled image 502 to the residual image generation module 402.

In case that the copy 501' is down-sampled, a component of a high frequency band may be lost. The artifact component of the high frequency band may have relatively less conspicuous characteristics than those of the artifact component of a low frequency band. Further, the artifact component of the high frequency band may appear less than the artifact component of the low frequency band. For example, since the artifact component of the high frequency band is a visually negligible pattern, the necessity of finding, removing, or reducing the same may be relatively low. Accordingly, rather than the original image 501 or the copy 501' thereof, the down-sampled image 502 may be used as an input value of the residual image generation module 403.

The residual image generation module 403 may generate a residual image 503 using the down-sampled image 502. The residual image generation module 403 may output the residual image 503 to the up-sampling module 404.

The residual image generation module 403 may include the generation model 510 (e.g., artificial neural network) learned using a first training image and a second training image that makes a pair with the first training image. The generation model 510 may be learned using the first training image and the second training image having the same size as the size of the original image 501 or the down-sampled image 502. The generation model 510 may include a model (e.g., neural network, support vector machine (SVM), hidden Markov model (HMM), or Bayesian) pre-learned based on machine learning. The residual image generation module 403 may put the down-sampled image 502 into the generation model 510 as an input value, and may obtain the residual image from the resultant value output from the generation model 510. The residual image 503 may represent a difference between an image in which the artifact is present by the light diffraction phenomenon and an image in which the artifact is not present.

Referring to FIG. 7B, the residual image 503 having the resolution of (N/n)*(M/m) and including a difference of low frequency components may be obtained from the resultant value of the generation model 510.

An image may be obtained by photographing a subject with a camera that is located inside the housing and of which at least a part (e.g., the lens) is visually recognized from an outside without the display between the subject and the camera as an obstacle (hereinafter, a normal camera). By reducing the resolution of the image taken by the normal camera, the first training image (e.g., an image having the size of (N/n)*(M/m)) corresponding to the input value of the generation model 510 may be generated.

A UDC image may be obtained by photographing the subject with the camera in a state where the display is located between the subject and the camera as the obstacle. By reducing the resolution of the UDC image, the second training image (e.g., an image having the size of (N/n)*(M/m)) corresponding to the resultant value of the generation model 510 may be generated. The generation model 510 may perform learning for artifact detection by using several pairs of training images generated in the above-described method.

According to another embodiment, the image taken by the normal camera may be obtained in the same way as above, and the first training image may be generated by down-sampling the image. By distorting the image using a point spread function (PSF) in which the display characteristics are reflected, a focus-blurred image corresponding to the UDC image may be obtained. For example, a blurred image corresponding to the UDC image including the artifact may be obtained from the image taken by the normal camera through image post-processing by adding digital virtual illumination having enough brightness to cause the artifact in the image taken by the normal camera, by causing virtual diffraction through the PSF in which the display characteristics are reflected and a convolution work between the images, and by clipping a pixel value with a predetermined threshold value. By reducing the resolution of the UDC image distorted as above, the second training image corresponding to the resultant value of the generation model 510 may be generated.

For example, with reference to FIG. 6, an image 610 may be obtained by photographing a point light source with the normal camera in a darkroom. By post-processing the image 610 taken by the normal camera, in which the display characteristics are reflected by the PSF, a distorted image 620 in which the point light source is spread may be obtained. A pair of training images may be generated by down-sampling the image 610 taken by the normal camera and the distorted image 620. The generation model 510 may perform the learning for the artifact detection by itself using several pairs of training images generated in the above-described method.

Referring again to FIG. 5, the up-sampling module 404 may enlarge the size (resolution) of the residual image 503 to the same size of the original image 501 by up-sampling (or up-scaling) the residual image 503 received from the residual image generation module 403. The up-sampling module 404 may output the up-sampled image 504 to the subtraction module 405.

The time required to obtain the residual image 503 from the original image 501 using the generation model 510 may be proportional to the resolution of the image. For example, the time required to obtain the residual image 503 from the copy 501' having the resolution of N*M that is the same as the resolution of the original image 501 may be N*M. In contrast, the time required to obtain the residual image 503 from the down-sampled image 502 having the resolution of (N/n)*(M/m) may be (N/n)*(M/m). That is, when the input value corresponds to the down-sampled image 502, the processing speed of the generation model 510 may be n*m times as fast as that in case that the input value corresponds to the copy 501'. Relatively, the time required to perform down-sampling and up-sampling may be at a negligible level in comparison to the time required to detect the artifact from the copy 501' having the resolution of N*M.

The subtraction module 405 may output an image 505 having an improved image quality by subtracting the up-sampled image 504 from the original image 501. For example, the subtraction module 405 may subtract the pixel value of the original image 501 by the pixel value of the up-sampled image 504 for each pixel. Through comparison of the image 505 having the improved image quality of FIG. 7C with the original image 501 of FIG. 7A, it may be identified that the artifact is inconspicuous in the image 505.

Referring again to FIG. 4, at least one of the modules 401 to 405 may be stored in the memory 488 (e.g., memory 130 of FIG. 1) as instructions, and may be executed by the processor 499 (e.g., processor 120 of FIG. 1). At least one of the modules 401 to 405 (e.g., residual image generation module 403) may be executed by a processor (e.g., auxiliary processor 123) specialized to process an AI model.

At least one of the modules 401 to 405 may be omitted from the electronic device 400, and may be implemented in an external device (e.g., server 108 of FIG. 1) instead. For example, the generation model 510 may be included in the external device. The generation model 510 may transmit the input value (e.g., down-sampled image 502) to be put into the generation model 510 to the external device through the wireless communication circuit (e.g., wireless communication module 192 of FIG. 1). The processor 499 may receive the resultant value (e.g., residual image 503) output from the residual image generation module 403 from the external device through the wireless communication circuit.

Figure 8:
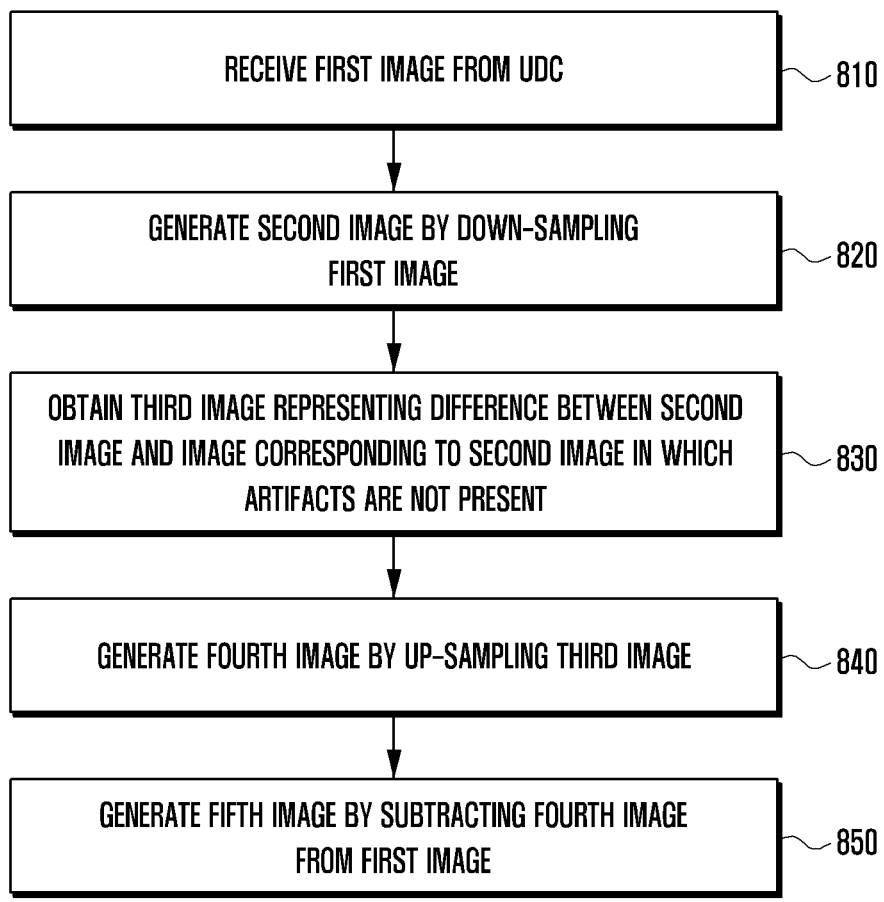
FIG. 8 is a flowchart illustrating a method of an electronic device for improving quality of a UDC image according to an embodiment.

FIG. 8 is a flowchart illustrating a method of an electronic device for improving quality of a UDC image according to an embodiment. For example, the method in FIG. 8 will be described below as being performed by the electronic device 400 of FIG. 4.

At operation 810, the processor 499 (e.g., processor 120 of FIG. 1) may receive a first image having a resolution of N*M from the UDC 420. For example, the first image may include data composed of a Bayer pattern or an RGB pattern output from the image sensor in the UDC 420. An image obtained by processing the image output from the image sensor through the ISP in the UDC 420 (e.g., a preview image having a resolution that is lower than the resolution of the image output from the image sensor) may be output to the processor 499 as the first image.

At operation 820, the processor 499 may generate a second image having the size of (N/n)*(M/m) by down-sampling the first image.

At operation 830, the processor 499 may obtain a third image representing a difference between the second image and an image corresponding to the second image in which artifacts are not present. In obtaining the third image, an AI model (e.g., the generation model 510 of FIG. 5) pre-learned based on machine learning may be used.

The processor 499 may put the second image into the generation mode 510 as an input value, and may obtain the third image from the resultant value output from the generation model 510. The size of the third image obtained using the generation model 510 may be (N/n)*(M/m) that is equal to the size of the second image.

The processor 499 may transmit the second image to the external electronic device (e.g., electronic device 104 or server 108 of FIG. 1) through the wireless communication circuit (e.g., wireless communication module 192 of FIG. 1). The AI model included in the external electronic device may output the third image by processing the second image input as the input value. The processor 499 may obtain the third image from the external electronic device through the wireless communication circuit.

At operation 840, the processor 499 may generate a fourth image having the size of N*M that is equal to the size of the first image by up-sampling the third image.

At operation 850, the processor 499 may generate a fifth image having an improved image quality by subtracting (deducting) the fourth image from the first image. The processor 499 may display the fifth image on the display 410 as the preview image. The processor 499 may generate the preview image by reducing the resolution of the fifth image, and may display the preview image on the display 410. The processor 499 may store the fifth image in the memory 488 in response to a user input (e.g., a capture command). The processor 499 may transmit the fifth image to the external electronic device (e.g., a cloud server) through the wireless communication circuit in response to the user input, and thus the fifth image may be stored in the external electronic device.

In an embodiment, an electronic device (e.g., electronic device 400) may include: a camera (e.g., UDC 420); a display (e.g., display 410) located between a subject to be photographed by the camera and the camera; a processor (e.g., processor 499) connected to the camera and the display; and a memory (e.g., memory 488) operatively connected to the processor, wherein the memory, when executed, stores instructions causing the processor to: receive a first image (e.g., original image 501) from the camera, generate a second image (e.g., down-sampled image 502) by lowering a resolution of the first image, obtain a third image (e.g., residual image 503) representing a difference between the second image and an image corresponding to the second image in which artifacts are not present, generate a fourth image (e.g., up-sampled image 504) by increasing the resolution of the third image, and generate a fifth image (image 505 having an improved image quality) by subtracting the fourth image from the first image.

The instructions may cause the processor to generate the second image by lowering the resolution of the first image from N*M to (N/n)*(M/m), and generate the fourth image by increasing the resolution of the third image from (N/n)*(M/m) to N*M.

The instructions may cause the processor to put the second image into an AI model learned using a first training image having the resolution of (N/n)*(M/m) and a second training image having the resolution of (N/n)*(M/m) and making a pair with the first training image as an input value, and obtain the third image from a resultant value output from the AI model.

The instructions may cause the processor to transmit the second image to an AI model provided in an external electronic device through a wireless communication circuit of the electronic device, and obtain the third image from the AI model of the external electronic device through the wireless communication circuit.

The instructions may cause the processor to receive data including a Bayer pattern or an RGB pattern from the camera as the first image.

The camera may obtain data including a Bayer pattern or an RGB pattern by photographing the subject, and process the data, and the instructions may cause the processor to receive the processed data from the camera as the first image.

The instructions may cause the processor to display a fifth image or a sixth image having a resolution lower than the resolution of the fifth image on the display.

The instructions may cause the processor to perform at least one operation of storing the fifth image in the memory and transmitting the fifth image to an external electronic device through a wireless communication circuit of the electronic device.

In an embodiment, a method for operating an electronic device may include receiving a first image from a camera of the electronic device (e.g., operation 810); generating a second image by lowering a resolution of the first image (e.g., operation 820); obtaining a third image representing a difference between the second image and an image corresponding to the second image in which artifacts are not present (e.g., operation 830); generating a fourth image by increasing the resolution of the third image (e.g., operation 840); and generating a fifth image by subtracting the fourth image from the first image (e.g., operation 850).

Generating the second image and the fourth image may include generating the second image by lowering the resolution of the first image from N*M to (N/n)*(M/m); and generating the fourth image by increasing the resolution of the third image from (N/n)*(M/m) to N*M.

Obtaining the third image may include putting the second image into an AI model learned using a first training image having the resolution of (N/n)*(M/m) and a second training image having the resolution of (N/n)*(M/m) and making a pair with the first training image as an input value; and obtaining the third image from a resultant value output from the AI model.

Obtaining the third image may include transmitting the second image to an AI model provided in an external electronic device through a wireless communication circuit of the electronic device; and obtaining the third image from the AI model of the external electronic device through the wireless communication circuit.

Receiving the first image may include receiving data including a Bayer pattern or an RGB pattern from the camera as the first image.

The camera may obtain data including a Bayer pattern or an RGB pattern by photographing the subject, and process the data, and receiving the first image may include receiving the processed data from the camera as the first image.

The method may further include displaying a fifth image or a sixth image having a resolution lower than the resolution of the fifth image on the display of the electronic device.

The method may further include performing at least one operation of storing the fifth image in the memory of the electronic device and transmitting the fifth image to an external electronic device through a wireless communication circuit of the electronic device.

In an embodiment, a non-transitory recording medium may store instructions that are readable by a processor of an electronic device. The instructions, when executed by the processor, may cause the processor to receive a first image from the camera of the electronic device, generate a second image by lowering a resolution of the first image, obtain a third image representing a difference between the second image and an image corresponding to the second image in which artifacts are not present, generate a fourth image by increasing the resolution of the third image, and generate a fifth image by subtracting the fourth image from the first image.

The various embodiments of the disclosure that are described above and illustrated in the drawings are merely for easy explanation of the technical contents of the embodiments of the disclosure and proposal of specific examples to help understanding of the embodiments of the disclosure, but are not intended to limit the scope of the embodiments of the disclosure. Accordingly, it should be construed that all changes or modifications derived based on the technical concept of the various embodiments of the disclosure are included in the scope of the various embodiments of the disclosure in addition to the embodiments disclosed herein.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
   a camera;
   a display located between a subject to be photographed by the camera and the camera;
   a processor connected to the camera and the display; and
   a memory that stores instructions, which when executed, cause the processor to:
      receive a first image from the camera,
      generate a second image by lowering a resolution of the first image from NM to (N/n)(M/m),
      put the second image into an artificial intelligence (AI) model learned using a first training image having a resolution of (N/n)(M/m) and a second training image having a resolution of (N/n)(M/m) and making a pair with the first training image as an input value,
      obtain a third image from a resultant value output from the AI model representing a difference between the second image and an image corresponding to the second image in which artifacts are not present,
      generate a fourth image by increasing a resolution of the third image from (N/n)*(M/m) to N*M, and
      generate a fifth image by subtracting the fourth image from the first image.

2. The electronic device of claim 1, wherein the instructions, when executed, further cause the processor to:
   transmit the second image to the AI model provided in an external electronic device through a wireless communication circuit of the electronic device, and
   obtain the third image from the AI model of the external electronic device through the wireless communication circuit.

3. The electronic device of claim 1, wherein the instructions, when executed, further cause the processor to receive data including a Bayer pattern or a red-green-blue (RGB) pattern from the camera as the first image.

4. The electronic device of claim 1, wherein the camera obtains data including a Bayer pattern or a red-green-blue (RGB) pattern by photographing the subject, and processes the data, and wherein the instructions further cause the processor to receive the processed data from the camera as the first image.

5. The electronic device of claim 1, wherein the instructions, when executed, further cause the processor to display the fifth image or a sixth image having a resolution that is lower than the resolution of the fifth image on the display.

6. The electronic device of claim 1, wherein the instructions, when executed, further cause the processor to perform at least one operation of storing the fifth image in the memory and transmitting the fifth image to an external electronic device through a wireless communication circuit of the electronic device.

7. A method performed by an electronic device, the method comprising:
receiving a first image from a camera of the electronic device;
generating a second image by lowering a resolution of the first image from N*M to (N/n)*(M/m);
putting the second image into an artificial intelligence (AI) model learned using a first training image having a resolution of (N/n)*(M/m) and a second training image having a resolution of (N/n)*(M/m) and making a pair with the first training image as an input value;
obtaining a third image from a resultant value output from the AI model, the third image representing a difference between the second image and an image corresponding to the second image in which artifacts are not present;
generating a fourth image by increasing a resolution of the third image from (N/n)*(M/m) to N*M; and
generating a fifth image by subtracting the fourth image from the first image.

8. The method of claim 7, wherein obtaining the third image comprises:
transmitting the second image to the AI model provided in an external electronic device through a wireless communication circuit of the electronic device; and
obtaining the third image from the AI model of the external electronic device through the wireless communication circuit.

9. The method of claim 7, wherein receiving the first image comprises receiving data including a Bayer pattern or a red-green-blue (RGB) pattern from the camera as the first image.

10. The method of claim 7, wherein the camera obtains data including a Bayer pattern or a red-green-blue (RGB) pattern by photographing the subject, and processes the data, and
wherein receiving the first image comprises receiving the processed data from the camera as the first image.

11. The method of claim 7, further comprising displaying the fifth image or a sixth image having a resolution that is lower than the resolution of the fifth image on a display of the electronic device.

12. The method of claim 7, further comprising:
performing at least one operation of storing the fifth image in a memory of the electronic device; and
transmitting the fifth image to an external electronic device through a wireless communication circuit of the electronic device.

13. A non-transitory recording medium that stores instructions, which when executed by a processor of an electronic device, cause the processor to:
receive a first image from a camera of the electronic device;
generate a second image by lowering a resolution of the first image from N*M to (N/n)*(M/m);
put the second image into an artificial intelligence (AI) model learned using a first training image having a resolution of (N/n)*(M/m) and a second training image having a resolution of (N/n)*(M/m) and making a pair with the first training image as an input value;
obtain a third image from a resultant value output from the AI model, the third image representing a difference between the second image and an image corresponding to the second image in which artifacts are not present;
generate a fourth image by increasing a resolution of the third image from (N/n)*(M/m) to N*M; and
generate a fifth image by subtracting the fourth image from the first image.

14. The non-transitory recording medium of claim 13, wherein receiving the first image comprises receiving data including a Bayer pattern or a red-green-blue (RGB) pattern from the camera as the first image.

15. The non-transitory recording medium of claim 13, wherein the camera obtains data composed of a Bayer pattern or a red-green-blue (RGB) pattern by photographing the subject, and processes the data, and
wherein receiving the first image comprises receiving the processed data from the camera as the first image.

* * * * *